United States Patent [19]
Agrawal et al.

[11] Patent Number: 5,930,789
[45] Date of Patent: Jul. 27, 1999

[54] SYSTEM AND METHOD FOR DISCOVERING SIMILAR TIME SEQUENCES IN DATABASES

[75] Inventors: Rakesh Agrawal, San Jose, Calif.; King-Ip Lin, College Park, Md.; Harpreet Singh Sawhney, Plainsboro, N.J.; Kyuseok Shim, San Jose, Calif.

[73] Assignee: International Business Machines Corporation, Armonk, N.Y.

[21] Appl. No.: 08/920,031

[22] Filed: Aug. 28, 1997

Related U.S. Application Data

[63] Continuation of application No. 08/437,746, May 9, 1995, Pat. No. 5,664,174.

[51] Int. Cl.$^6$ .................................................. G06F 17/30
[52] U.S. Cl. ........................................ 707/6; 707/3; 707/1
[58] Field of Search ............................... 707/6, 3, 7, 1

[56] References Cited

U.S. PATENT DOCUMENTS

| | | | |
|---|---|---|---|
| 4,882,756 | 11/1989 | Watari | 381/42 |
| 4,977,603 | 12/1990 | Irie et al. | 382/34 |
| 5,544,352 | 8/1996 | Egger | 395/600 |
| 5,664,174 | 9/1997 | Agrawal et al. | 707/6 |
| 5,742,811 | 4/1998 | Agrawal et al. | 707/6 |
| 5,799,301 | 8/1998 | Castelli et al. | 707/6 |

OTHER PUBLICATIONS

R. Agrawal et al., "Database Mining: A Performance Perspective", Proc. 4th Int'l Conf. on Foundations of Data Organization and Algorithms, Chicago, Illinois, 1993.
R. Agrawal et al., "Efficient Similarity Search in Sequence Databases", Proceeding of the Fourth Int'l Conf. on Foundations of Data Organization and Algorithms, Chicago, Illinois, Oct. 1993.
A. Califano, et al., "Multidimensional Indexing for Recognizing Visual Shapes", IEEE Trans. on Pattern Analysis and Machine Intelligence, 16(4):373–392, 1994.
C. Faloutsos et al., "Fast Sequence Matching in Time–Series Databases", Proc. ACM Sigmod Conf. on Mangement of Data, May, 1994.
W.E.L. Grimson et al., "On the Sensitivity of Geometric Hashing", Proc. 3rd Int'l Conf. on Computer Vision, pp. 334–338, 1990.
Y. Lamdan et al., "Geometric Hashing: A general and Efficient Model–Based Recognition Scheme", Proc. 2nd Int'l Conf. on Computer Vision, pp. 238–249, 1988.
T. Sellis et al., "The R+_Tree: A Dynamic Index for Multi–Dimensional Objects", Proc. 13th Int'l. Conf. on VLDB, pp. 507–518, England, 1987.
"Mining Sequential Patterns", Rakesh Agrawal & Ramakrishnan Srikant, IEEE Comput. Soc. Press, 1063–6382, pp. 3–14, Mar. 1995.
"Set–Oriented Mining For Association Rules In Relational Databases", Maurice Houtsma & Arun Swami, IEEE Comput. Soc. Press, 1063–6382, pp. 25–33, Mar. 1995.

*Primary Examiner*—Thomas G. Black
*Assistant Examiner*—Greta L. Robinson
*Attorney, Agent, or Firm*—Gray Cary Ware Freidenrich

[57] ABSTRACT

A system and method for discovering similar time sequences in a database of time sequences includes a computer-implemented program which first breaks each sequence into small windows. The windows from the first sequence are compared to selected windows from the second sequence to determine which windows are similar. Pairs of similar windows are then stitched together when certain stitching constraints are met to establish pairs of similar subsequences. Likewise, pairs of similar subsequences are stitched together, and the lengths of the stitched subsequences are then compared to the overall length of the time sequences to determine whether the time sequences meet a similarity criteria.

3 Claims, 6 Drawing Sheets

SYSTEM AND METHOD FOR DISCOVERING SIMILAR TIME SEQUENCES IN DATABASES

This application is a continuation of application Ser. No. 08/437,746, filed May 9, 1995, now U.S. Pat. No. 5,664,174.

CROSS REFERENCE TO RELATED APPLICATIONS

This application contains material related to the following co-pending U.S. Patent Applications, which are commonly assigned with this application:

U.S. patent application Ser. No. 08/398,640, filed Mar. 3, 1995 for "SYSTEM AND METHOD FOR MINING SEQUENTIAL PATTERNS IN A LARGE DATABASE", and now U.S. Pat. No. 5,819,266.

The above-referenced U.S. Patent Application is incorporated herein by reference.

BACKGROUND OF THE INVENTION

1. Field of the Invention

The present invention relates generally to data processing, and more particularly to "computer database mining" in which similar time sequences are discovered. In particular, the invention concerns discovering, in a large database, similarities in the patterns between time sequences of data.

2. Description of the Related Art

Sequences of events over time, hereinafter "time sequences", can be and often are electronically recorded in databases. As recognized by the present invention, the capability to identify time sequences that are similar to each other has many applications, including, e.g., identifying companies with similar patterns of earnings and sales growth. As another example, it would be advantageous to identify similar time sequences in product sales patterns, and to discover stocks that have similar price movements over time. Indeed, discovering similar and/or dissimilar time sequences in seismic waves has many useful applications, such as identifying geological irregularities.

Mining systems to discover similar time sequences have been disclosed in Agrawal et al., "Database Mining: A Performance Perspective", *Proc. of the Fourth Int'l Conf. on Foundations of Data Organization and Algorithms*, Chicago, 1993, and in Falputsos et al., "Fast Sub-sequence Matching in Time-series Databases", *Proc. of the ACM Sigmod Conf. on Management of Data*, May, 1994. The systems and methods disclosed in the above-mentioned publications, however, share several drawbacks which limit their practical application. Among the drawbacks are that the methods are inherently overly sensitive to a few data anomalies. Further, the methods referred to above do not address the problems of amplitude scaling and translation of sequences. Consequently, they are effectively unable to identify, e.g., similarities in the price sequences of two stocks if one stock fluctuates around $10 and the other stock fluctuates around $75.

Still further, the methods referred to above are unable to effectively ignore small non-matching regions of two otherwise similar time sequences. Consequently, the methods can fail to identify certain actually similar time sequences as being similar.

In addition, prior methods for data processing in time sequence similarity discovery models suffer several drawbacks. Among the disadvantages of prior data processing regimes, which are used to index the time sequences incident to matching similar time sequences, are that many false matches tend to be identified. Also, the previous methods tend to be computationally intensive, and the methods inherently make it difficult for the user to vary the criteria that are used to define the conditions for time sequence similarity.

Accordingly, it is an object of the present invention to provide a system and method for discovering similar time sequences that are stored in a large database which establish similarity criteria that can be easily varied. Another object of the present invention is to provide a system and method for discovering similar time sequences which identifies similar time sequences in the presence of a few data anomalies and non-matching regions. Still another object of the present invention is to provide a system and method for discovering similar time sequences which can identify two time sequences as being similar when the amplitude scaling of one time sequence differs significantly from the amplitude scaling of the other time sequence. Yet another object of the present invention is to provide a system and method for discovering similar time sequences which is easy to use and cost-effective.

SUMMARY OF THE INVENTION

The invention concerns a procedure to discover similar time sequences in a large database of time sequences.

This invention is realized in a critical machine component that embodies a program of instructions which are executable by a digital processing apparatus. The machine component causes the digital processing apparatus to perform method steps for discovering similar time sequences that are stored in a large database. Hereinafter, the machine component is referred to as a "computer program product".

In accordance with the present invention, the method steps include identifying first and third subsequence windows, each having a plurality of data elements, each data element being characterized by at least a time and a magnitude. Each of the first and third windows is a subset of the first time sequence. The first and third windows are identified as being similar to respective second and fourth subsequence windows in the second time sequence when the difference between a magnitude of a data element of the first window and a magnitude of a data element of the second window is no more than a predetermined value, and the difference between a magnitude of a data element of the third window and a magnitude of a data element of the fourth window is no more than the predetermined value.

Further, when the first and third windows and second and fourth windows are separated by respective time gaps and each gap is less than a predetermined value, the method steps include joining the first and third windows to establish a first subsequence representative of the first time sequence. Additionally, the method steps include joining the second and fourth windows to establish a second subsequence representative of the second time sequence for identifying recurring patterns in the database. Preferably, the method steps also include establishing the first and second subsequences when the first and third windows overlap each other in time by a first overlap distance and the second and fourth windows overlap each other by the first overlap distance.

In accordance with the present invention, the first and second subsequences are established only when the times of the earliest data elements in the third and fourth windows are later than the times, of the earliest data elements in the first and second windows, respectively. In the presently preferred embodiment, third and fourth subsequences that are respectively representative of the first and second time sequences are also established, and the times of each data element in the third and fourth subsequences is later than the times of each data element in the first and second subsequences, respectively.

Consequently, the first and third subsequences are separated by a gap and the second and fourth subsequences are separated by a gap. The first and third subsequences are joined and the second and fourth subsequences are joined when the gaps do not exceed a predetermined value.

As intended by the present invention, each subsequence and the first and second time sequences are characterized by respective lengths, and the method steps further include comparing the sum of the lengths of the subsequences to at least one of the lengths of the time sequences to generate a comparison value. Then, the first and second time sequences are identified as being similar when the comparison value equals a predetermined value. In one preferred embodiment, each window contains $\omega$ data elements, and each window is represented as a data point in a hierarchical data tree having $\omega$ dimensions.

In another aspect of the present invention, a computer program product is disclosed which is readable by a digital processing apparatus and which tangibly embodies a computer program. The computer program product combines a computer readable medium with program code elements that discover similar time sequences in a database of time sequences.

In this invention, the code elements are embodied in a program stored on the computer readable medium. These code elements include computer readable code means for identifying first and third subsequence windows. In accordance with principles disclosed herein, each window has a predetermined number of data elements and each window is a subset of the first time sequence. The first and third windows are respectively identified to be similar to second and fourth subsequence windows of the second time sequence when the difference between each data element of the first window and the corresponding data elements of the second window is no more than a predetermined value and the difference between each data element of the third window and the corresponding data elements of the fourth window is no more than the predetermined value.

Moreover, the computer program product of the present invention includes computer readable code means for joining the first and third windows to establish a first subsequence representative of the first time sequence. The computer readable code means also joins the second and fourth time sequences. The above-described joins are accomplished when the first and third windows and second and fourth windows are separated by respective gaps, and each gap is less than a predetermined value. The computer program product then identifies whether the first and second time sequences are similar.

In yet another aspect, a database mining system discovers, for a first time sequence stored therein, a second time sequence that is similar to the first. The system of the present invention includes a match determiner for generating first and second sets of subsequence windows respectively representing the first and second sequences. At least one window is characterized by a respective normalized value.

As contemplated by the present invention, the match determiner matches a test window in the first set of subsequence windows with a test window in the second set of subsequence windows when the difference between the values of the test windows is less than or equal to a predetermined difference. Furthermore, the match determiner designates as a pair of matched windows the test window from the first set of subsequence windows and the test window from the second set of subsequence windows.

Additionally, the system of the present invention includes a window stitcher for joining at least two pair of matched windows to establish a first subsequence and for joining at least two pair of matched windows to establish a second subsequence. The joins are undertaken when (1) the two windows in the first subsequence do not overlap and are separated by a gap and the two windows in the second subsequence do not overlap and are separated by a gap, and the gaps are each less than a predetermined value. Also, the joins are undertaken when (2) the two windows in the first subsequence overlap each other the same amount as two corresponding windows in the second subsequence overlap each other.

In still another aspect, a computer-based system is disclosed for discovering similarities between first and second time sequences. In accordance with the present invention, each time sequence has respective sets of first and second subsequence windows, and each window includes $\omega$ data points. Each data point is characterized by at least a time and a magnitude.

Per the present invention, the system includes a hierarchical database which is accessible by the computer for electronically storing the windows as corresponding points in $\omega$-dimensional space. Also, the system includes means for identifying one or more second windows as being similar to one or more corresponding first windows when the second window lies within a predetermined distance of the first window in the $\omega$-dimensional space. Thereby, a pair of similar windows is established. And, the system includes means for stitching pairs of first and second windows together when the windows satisfy one or more predetermined stitching criteria to identify similarities in the first and second time sequences.

It is to be understood that while for illustration purposes the above disclosure discusses the matching and stitching of only two windows per sequence, the present invention contemplates matching and stitching "n" windows per sequence, wherein $n \geq 2$.

The details of the present invention, both as to its structure and operation, can best be understood in reference to the accompanying drawings, in which like reference numerals refer to like parts, and in which:

BRIEF DESCRIPTION OF THE PREFERRED EMBODIMENTS

DETAILED DESCRIPTION OF THE PREFERRED EMBODIMENTS

Figure 1:
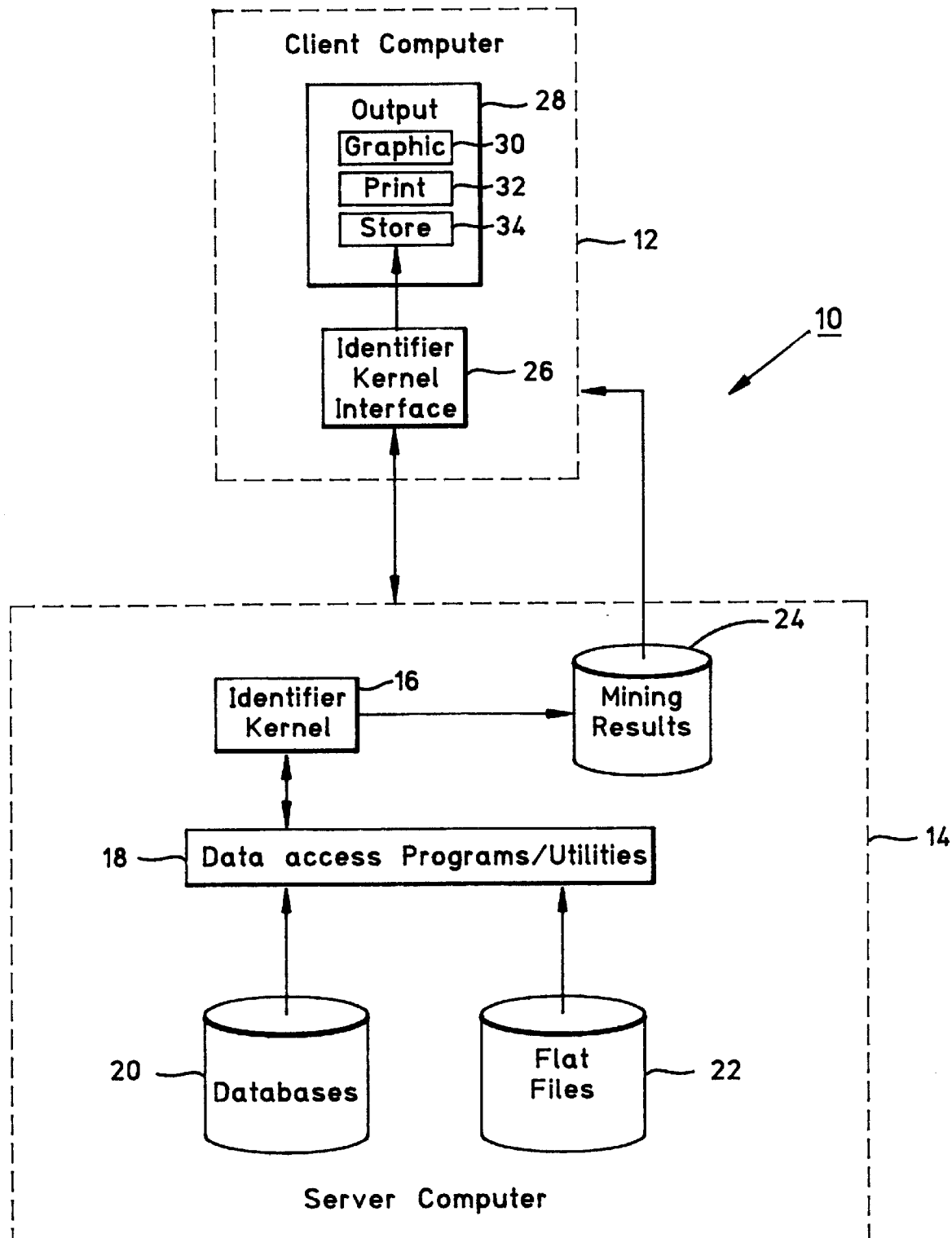
FIG. 1 is a functional block diagram of the system for discovering similar time sequences of the present invention.

Referring initially to FIG. 1, a computer system for mining databases for similar time sequences is shown, generally designated 10. In the particular architecture shown, the system 10 includes one or more digital processing apparatus, such as a client computer 12 and a server computer 14. In one intended embodiment, the server computer 14 may be a mainframe computer made by IBM Corp. of Armonk, N.Y., and use an operating system sold it under trademarks such as MVS. Or, the server computer 14 may be a Unix computer, or OS/2 server, or Windows NT server, or IBM RS/6000 250 workstation with 128 MB of main memory running AIX 3.2.5. The server computer 14 may own a database system, such as DB2 or ORACLE, or it may have data on files on some data storage medium such as disk, e.g., a 2 GB SCSI 3.5" drive, or tape. It is to be understood that architectures other than the one shown may be used. For example, the functions of the client computer 12 may be incorporated into the server computer 14, and vice versa.

As shown, the operating system of the server computer 14 includes a similar time sequence identifier kernel 16 which may be executed by a processor within the server computer 14 as a series of computer-executable instructions. These instructions may reside, for example, in RAM of the computer 14.

Figure 2:
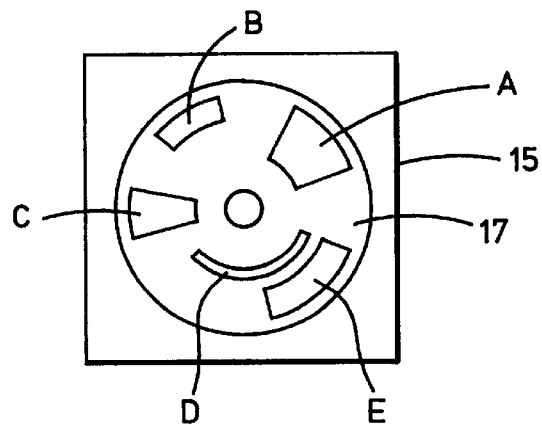
FIG. 2 illustrates a machine component embodying the invention, with portions cut away for illustration.

Alternatively, the instructions may be contained on a data storage device with a computer readable medium, such as a computer diskette 15 shown in FIG. 2. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ language code.

FIGS. 3, 5, 7, and 9 illustrate the structure of such instructions as embodied in a computer program. Those skilled in the art will appreciate that FIGS. 3, 5, 7, and 9 illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 2 as a combination of program code elements A–E in computer readable form that are embodied in a computer-usable data medium 17, on the computer diskette 15. As mentioned above, however, such media can also be found in semiconductor devices, on magnetic tape, and on optical disks.

Each of the code elements A–E is for directing a digital processing apparatus to facilitate some portion of the method by which this invention is practiced. Even when no single code element A–E includes the complete method, two or more of the code elements together may comprise all of the program means necessary to facilitate the practice of the invention.

FIG. 1 shows that, through appropriate data access programs and utilities 18, the identifier kernel 16 accesses one or more databases 20 and/or flat files (i.e., text files) 22 which contain data chronicling time sequences. After executing the steps described below, the discovery kernel outputs similar time sequences it discovers to a results repository 24, which can be accessed by the client computer 12.

Additionally, FIG. 1 shows that the client computer 12 can include an identifier kernel interface 26 which, like the identifier kernel 16, may be implemented in suitable computer code. Among other things, the interface 26 functions as an input mechanism for establishing certain variables, including the maximum distance $\epsilon$ between windows and the other predetermined/user-defined input parameters disclosed below. Further, the client computer 12 preferably includes an output module 28 for outputting/displaying the results on a graphic display 30, print mechanism 32, or data storage medium 34.

Figure 4:
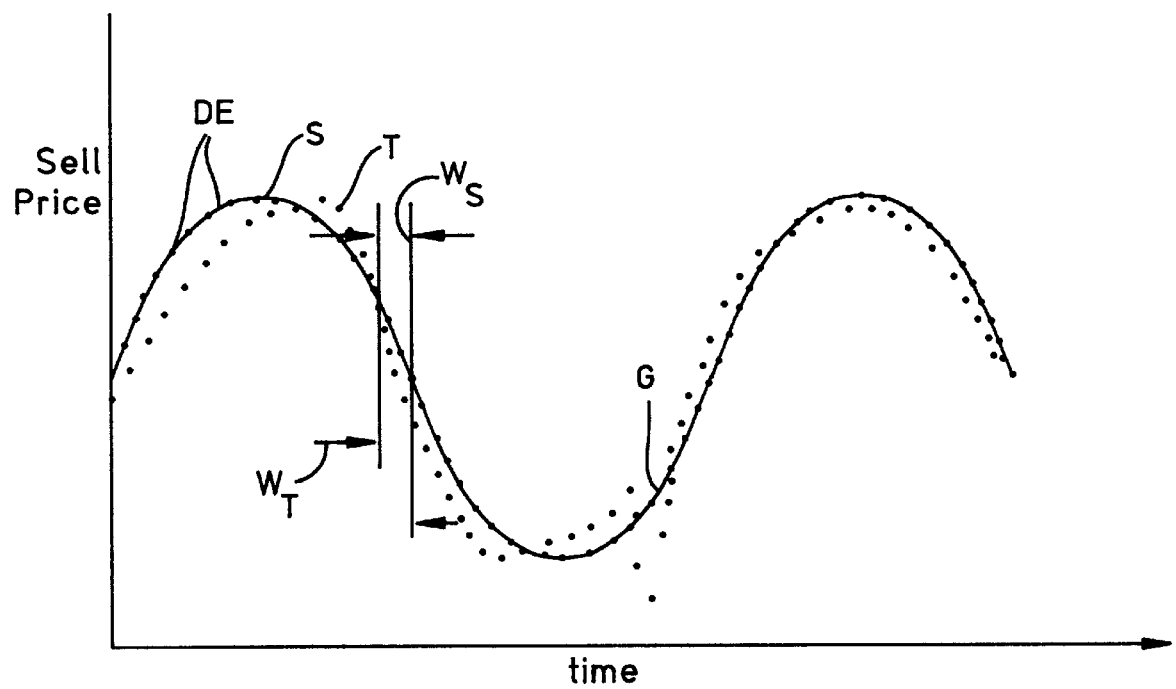
FIG. 4 is a graph showing two example time sequences between which it is desired to determine similarities.
Figure 3:
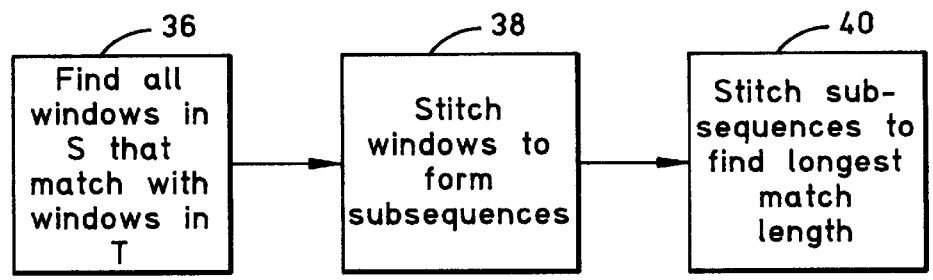
FIG. 3 is a flow chart showing the overall operation of the present invention.

FIG. 3 shows the overall method of the present invention in determining similarities between a first time sequence S that is stored in the database 20 and a second time sequence T that is likewise stored in the database 20. FIG. 4 schematically shows two such time sequences, which, in the embodiment shown, are time graphs of the sales price of two stocks. It is to be understood that the sequences S and T can represent time sequences of other parameters, e.g., seismic activity, company sales growth, and indeed virtually any time-dependent patterns.

It is to be further understood that the present invention is able to identify similarities between the two time sequences S and T, despite the presence, if any, of gaps (labelled G in FIG. 4). Essentially, a "gap" G is a subsequence in S that is dissimilar (as "dissimilar" is defined below using user-defined criteria) from the corresponding subsequence in T. Moreover, the system 10 can identify similarities between the sequences S, T despite the fact that the similarities may not be co-existent in time. Even further, the system 10 can identify similarities between the sequences S, T despite the fact that the two sequences S, T may have significantly different average magnitudes (i.e., S may denote a stock trading around $50 while T can denote a stock trading around $10).

Beginning with block 36 in FIG. 3, the identifier kernel 16 of the system 10 finds all windows in S that match corresponding windows in T, as disclosed in detail below. Thus, block 36 is essentially a match determiner for generating first and second sets of windows which respectively represent the first and second sequences S and T. Further, the match determiner established by block 36 matches a window in the first sequence S with a window in the second sequence T upon the occurrence of user-defined match criteria described below.

In accordance with the present invention and as schematically shown in FIG. 4, a "window" of the first sequence S (labelled $W_S$) is essentially an atomic subsequence which, when matched with a corresponding window $W_T$ of the second sequence T, is devoid of gaps. As intended by the present invention, each window $W_S$, $W_T$ consists of a user-defined number $\omega$ of data elements DE that are sequentially ordered in time, wherein $\omega \geq 3$ and preferably wherein $5 \leq \omega \leq 20$. In the example shown in FIG. 4, $\omega=3$. Each data element DE accordingly is characterized by at least a time and a magnitude, and, in the example shown in FIG. 4, the magnitude of each data element DE represents a sell price of the corresponding stock, while the time of each data element DE corresponds to a day.

Next, at block 38, the identifier kernel 16 of the system 10 joins (or, as termed herein, "stitches") two or more pair of matching windows upon the occurrence of the user-defined stitching criteria disclosed below to generate a pair of subsequences. Thus, block 38 establishes a window stitcher for joining at least two windows in the first sequence S and for joining their corresponding windows in the second sequence T, when predetermined stitching criteria are met. While parts of the discussion herein focus on matching and stitching two windows per time sequence S, T, the present invention contemplates that an arbitrary number "n" windows per sequence S will be matched with "n" corresponding windows in the sequence T, wherein $n \geq 2$.

Then, at block 40, two or more pair of subsequences are stitched such that the longest match length is determined for the time sequences S, T. Based upon the ratio of the match length to the total length of at least one of the sequences S, T, the identifier kernel 16 of the system 10 determines whether the first time sequence S is similar to the second time sequence T. Accordingly, block 40 establishes a similarity identifier for identifying whether one or more subsequences in the first time sequence S are similar to corresponding subsequences in the second time sequence T, and then identify whether the sequences S, T are similar in accordance with user-defined similarity criteria.

Figure 5:
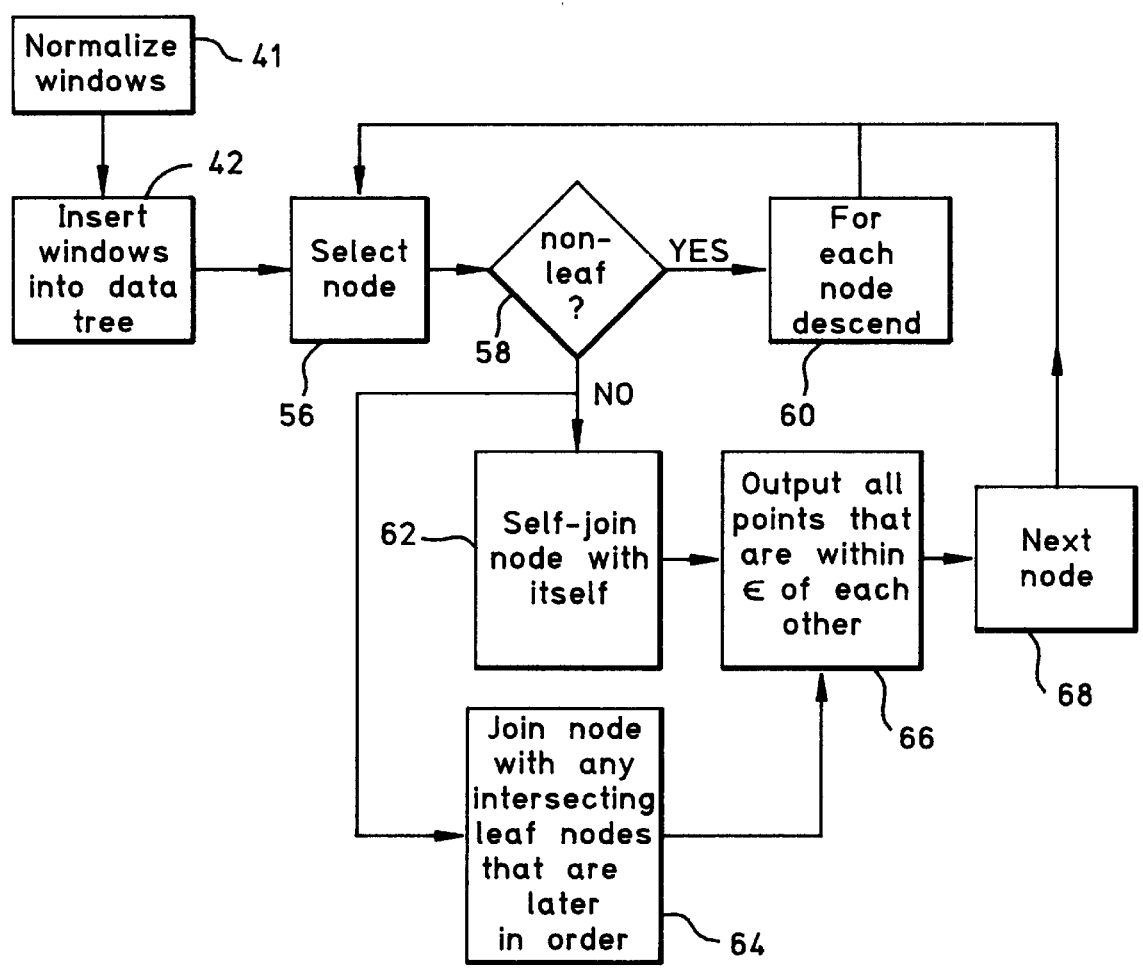
FIG. 5 is a flow chart showing the steps for identifying similar windows in two sequences, using the data tree shown in FIG. 6.

Now referring to FIG. 5, the method of identifying pairs of similar windows in the sequences S, T is shown. One approach to identify pairs of similar windows would be to simply compare a window with all other windows, but as recognized by the present invention, such an approach would consume relatively long computational time. FIG. 5 shows the preferred approach of the present invention in identifying pairs of similar windows which does not require relatively long computational time.

At block 41, the identifier kernel 16 of the system 10 normalizes each window by normalizing the magnitude of each data point in the window to be a value between −1 and 1, inclusive. To normalize a window, the identifier kernel 16 of the system 10 undertakes the following transformation for each data point of the window:

$\hat{W}[i]=(W[i]-(W_{min}+W_{max})/2)/(W_{max}-W_{min})/2$, wherein
$W[i]$=magnitude of the data point being transformed,
$\hat{W}[i]$=magnitude of the normalized data point, and
$W_{min}$ and $W_{max}$ are the minimum and maximum magnitudes, respectively, in the window.

As more fully disclosed below, under the principles of the present invention two windows $\hat{W}_1[i]$ and $\hat{W}_2[i]$ are similar if and only if $\forall i, \hat{W}_1[i]-\hat{W}_2[i] \leq \epsilon$, wherein $\epsilon$ is a user-defined predetermined value.

Figure 6:
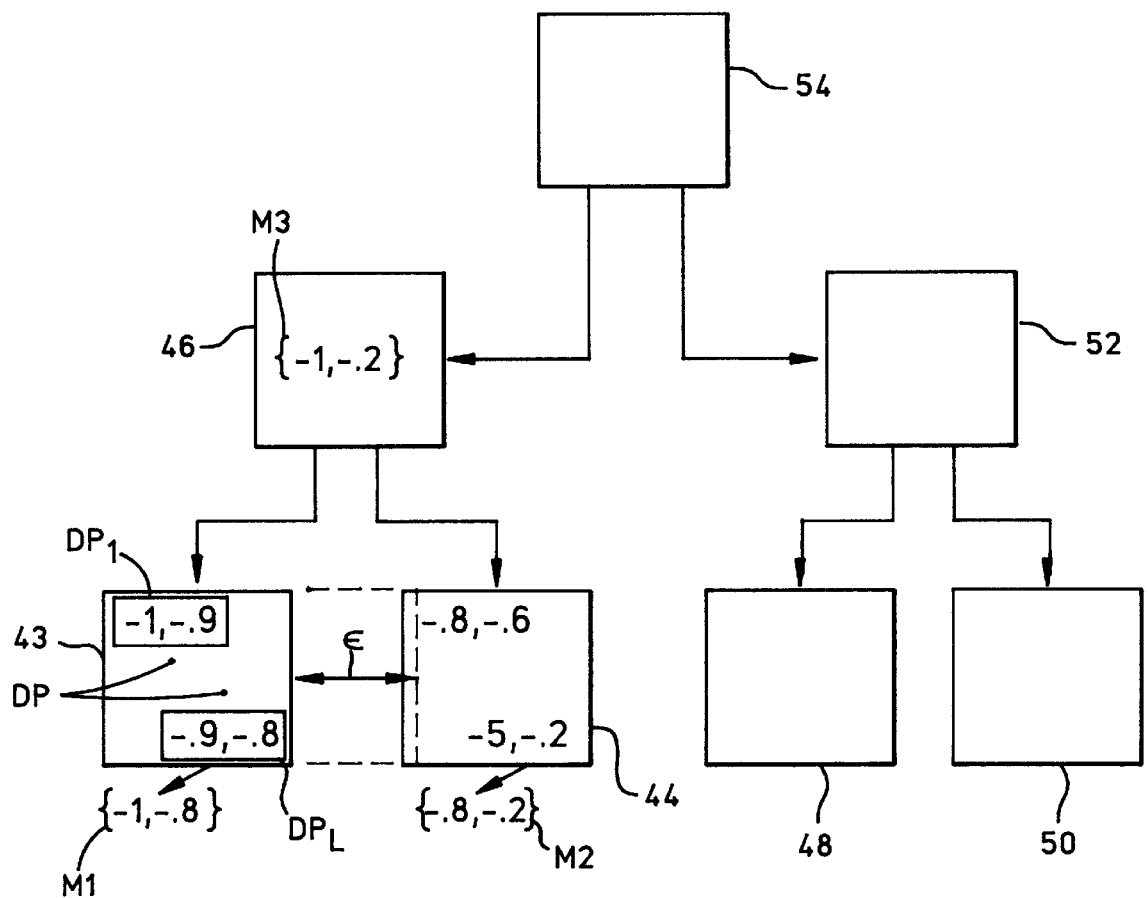
FIG. 6 is a schematic diagram of the $R^+$ data tree of the present invention.

Recall that the number of data points contained in each window is a user-defined predetermined integer number represented herein by the Greek letter $\omega$. With this in mind, at block 42 of FIG. 5, each normalized window is considered as a single point in $\omega$-dimensional space, with the coordinates of the window being defined by its normalized data elements, and the window is inserted into a hierarchical data tree structure. An example of such a structure for $\omega=2$ is shown in FIG. 6. It is to be understood that the data tree structure shown in FIG. 6 is accessible to one or both of the computers 12, 14 shown in FIG. 1, in accordance with principles discussed above.

In the presently preferred embodiment, the data tree structure is a so-called R+-Tree structure disclosed in Sellis et al., "The R+-Tree: A Dynamic Index for Multidimensional Objects", *Proc.* 13*th Int'l Conf. on VLDB*, pp. 507–518, England, 1987, with the modification disclosed herein. As disclosed in Sellis et al., an R+-Tree is a data structure which grows new data nodes as data is inserted into the structure. Depending on the data values, as the structure grows it can split and/or reconfigure nodes to support the inserted data.

As shown in reference to FIG. 6 and disclosed in Sellis et al., an R+-Tree is a hierarchical data tree structure. More specifically, using FIG. 6 as an example, an R+-Tree includes a plurality of leaf nodes (first and second leaf nodes 43, 44 shown) which depend from a parent node 46. Likewise, additional leaf nodes 48, 50 depend from a parent node 52, and both parent nodes 46, 52 depend from a root node 54. It is to be understood that while only four leaf nodes 43, 44, 48, 50 and three hierarchical levels are shown in FIG. 6, the data tree of the present invention can include a greater number of leaf nodes and levels.

Taking the first leaf node 43 as an example, a plurality of data points DP are entered into the first leaf node 43. Each data point DP represents a window, and the data points DP of a particular leaf node, e.g., the first leaf node 43, are relatively close together.

Thus, for example, the first leaf node 43 contains a first data point $DP_1$, schematically represented as a rectangle to indicate that its high value is −0.9 and its low value is −1. In the example shown, the first leaf node 43 also contains a last data point $DP_L$, schematically represented as a rectangle to indicate that its high value is −0.8 and its low value is −0.9.

In accordance with principles of R-Tree data structures, the data points DP are grouped in their respective leaf nodes, such that the data points DP that are between the first and last data points $DP_1$ and $DP_1$ in the first leaf node 43 range in value from the highest value (−0.8) of the last data point $DP_1$ to the lowest value (−1) of the first data point $DP_1$. Accordingly, the first window 43 includes a marker M1 that indicates the highest and lowest data point values contained in the window 43.

Likewise, the second window 44 includes a marker M2 that indicates the highest and lowest data point values contained in the window 44, which in the example shown are −0.2 and −0.8, respectively. As the skilled artisan accordingly will recognize, the leaf nodes of the R-Tree do not overlap, in that the values of the data points of one leaf node do not overlap any values of any data points in other leaf nodes. Indeed, the boundaries of the leaf nodes need not touch, but instead are constrained to the minimum necessary to encompass the data points contained in the node. Also, to indicate the range of data points in its path as shown in FIG. 6 the parent node 46 contains a marker indicating the highest and lowest values contained in the leaf nodes that depend from the parent node 46, in this case, −0.2 and −1.

In light of the above disclosure, it will be appreciated by those skilled in the art that the R+-Tree of the present invention does not store so-called "dead space", i.e., potentially large regions between actual data points. Moreover, the R+-Tree is comparatively resilient to higher dimensionalities (recall that $\omega$ can range up to and indeed exceed 20).

As recognized by the present invention, however, one problem with the data structure disclosed in Sellis et al. is that uneven distribution of data points can occur in the nodes of the structure, resulting in under-filled internal and leaf nodes and undesirably fast growth of the tree. The present invention addresses this problem by releasing a node from the tree when a downward split in the tree during growth results in an underfilled leaf node. For purposes of the present invention, a leaf node is underfilled if it is filled to 40% or less. The data points of the released node are reinserted in the tree at the node that had been the immediate parent of the released node. Likewise, when a data point is inserted that will cause adjacent nodes to overlap, the data point is stored and reinserted in the tree at a time at which succeeding node splitting and tree restructuring allow for the point to be inserted smoothly into an existing node.

After all windows have been inserted into the data tree shown in FIG. 6, similar windows are identified by ascertaining, for a given window or windows, which other data points (representing other windows) are within a distance ε of it. Referring back to FIG. 5, the identifier kernel 16 of the system 10 accomplishes this by moving to block 56, wherein one of the nodes of the data tree is selected, and then moving to decision block 58, wherein the identifier kernel 16 of the system 10 determines whether the node under test is a non-leaf node. If it is, the identifier kernel 16 of the system 10 moves to block 60, wherein the identifier kernel 16 of the system 10 recursively calls the process shown in FIG. 5 for the descendants of the node under test until a leaf node is reached.

On the other hand, if the identifier kernel 16 of the system 10 determines at decision block 58 that the node under test is a leaf node, the identifier kernel 16 of the system 10 proceeds in parallel to block 62, wherein the node is joined with itself, and to block 64, wherein the node is joined to any other nodes that are within a distance ε of the node under test. In FIG. 6, a portion of the second leaf node 44 is within the distance ε of the first leaf node 43, and so is joined with the first leaf node 43 at block 64.

From blocks 62 and 64, the identifier kernel 16 of the system 10 proceeds to block 66, wherein the identifier kernel 16 of the system 10 outputs all data points (i.e., windows) that are within the distance ε of each other and, hence, which satisfy the user-defined condition of similarity. From block 66, the identifier kernel 16 of the system 10 proceeds to block 68 to retrieve the next node for test, and thence to block 56.

To ensure that two leaf nodes are not needlessly joined more than once, an ancestor list is used in the recursive call an order is imposed on the descendants of each node. At block 64, the only nodes tested for joining with the node under test are nodes that come later in the order than the node under test.

To yet further reduce computation, the only data points in a node that is to be joined with the node under test which are considered at block 64 are those data points that lie within a distance ε of the boundary of the node to be joined. Still further, the data points in a given node are themselves ordered by one or more of their selected dimensions; hence, once a first data point in a self-joined node at block 62 has been compared with a second data point in the node, and the second data point has been found to be beyond the distance ε from the first data point, the first data point is not tested against data points that succeed the second data point in the order and hence are by definition further than the distance ε away from the first data point.

Figure 8:
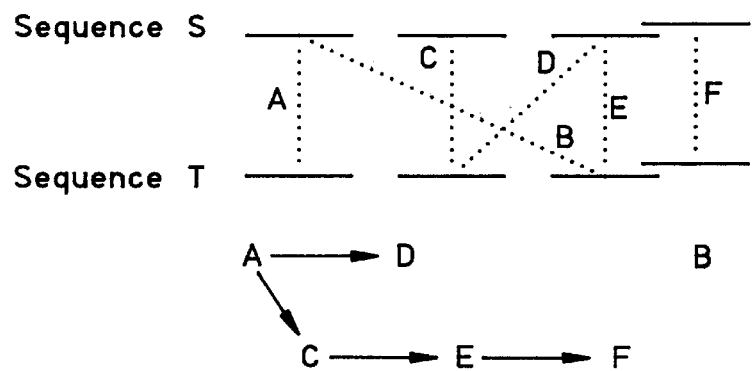
FIG. 8 is a schematic diagram showing an example of the stitching process shown in FIG. 7.
Figure 7:
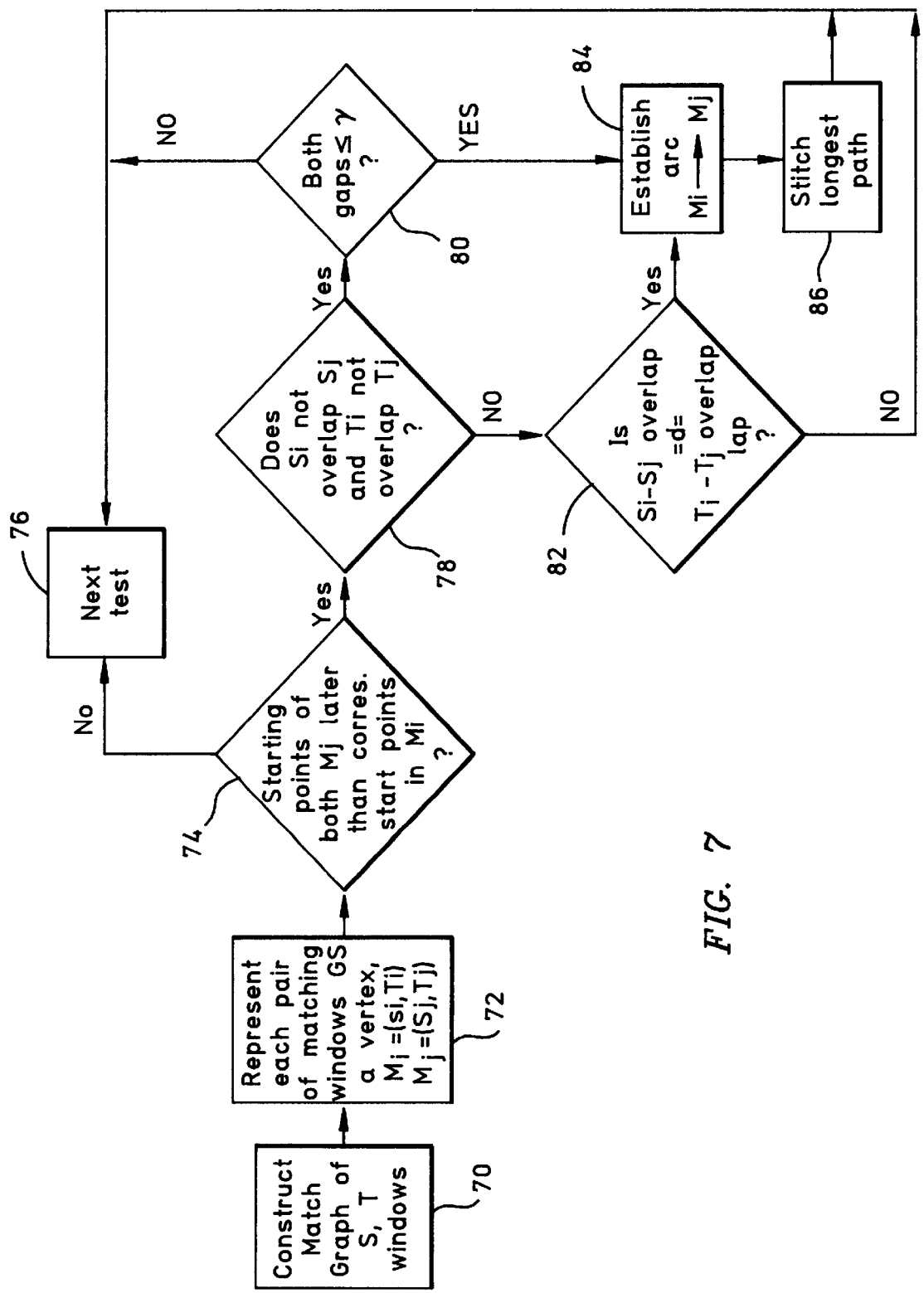
FIG. 7 is a flow chart showing the steps for stitching windows together to form two similar subsequences.

Turning now to FIGS. 7 and 8, the method by which the identifier kernel 16 of the system 10 stitches together pairs of similar windows can be appreciated. Starting at block 70 of FIG. 7, a match graph of pairs of similar windows in the time sequences S, T is constructed. A simplified graphic example of such a graph is shown in FIG. 8. In FIG. 8, each window is represented by a straight line in one of two rows, and the upper row represents windows $S_i$ in the sequence S while the lower row represents corresponding matched windows $T_i$ in the sequence T. The dotted lines indicate a matched pair, i.e., the dotted lines indicate a pair of windows that are similar. In the example shown, five matches A–E between four sets of windows exist.

Next, at block 72 in FIG. 7, the identifier kernel 16 of the system 10 represents each match as a corresponding vertex $M_i \ldots M_j, \ldots$ and then attempts to establish a stitching arc between two pairs of windows $M_i$, $M_j$ under test. To determine whether to establish a stitching arc, the identifier kernel 16 of the system 10 proceeds to decision block 74, wherein the identifier kernel 16 of the system 10 determines whether the times of the earliest data points in both windows $S_j$, $T_j$, represented by $M_j$, are respectively later than the times of the earliest data points in both windows $S_i$, $T_i$, represented by $M_i$.

If the test at decision block 74 is negative, the identifier kernel 16 of the system 10 moves to block 76 to conduct the next test. In contrast, if the test at decision block 74 is positive, the identifier kernel 16 of the system 10 moves to decision block 78, wherein the identifier kernel 16 of the system 10 determines whether either one of the windows $S_i$, $T_i$ overlaps its corresponding window $S_j$, $T_j$.

If it is determined at decision block 78 that $S_i$ does not overlap $S_j$ and that $T_i$ does not overlap $T_j$, the identifier kernel 16 of the system 10 moves to decision block 80, wherein it is determined whether the gap between the windows $S_i$ and $S_j$ and the gap between the windows $T_i$ and $T_j$ are less than a user-defined value γ. On the other hand, if it is determined at decision block 78 that $S_i$ overlaps $S_j$ and that $T_i$ overlaps $T_j$, the identifier kernel 16 of the system 10 moves to decision block 82, wherein it is determined whether the distance over which $S_i$ overlaps $S_j$ equals the distance over which $T_i$ overlaps $T_j$.

If either test at decision block 80 or 82 is negative, the identifier kernel 16 of the system 10 returns to block 76. If either test at decision block 80 or 82 is positive, however, the identifier kernel 16 of the system 10 proceeds to block 84, wherein an arc is established between the vertices $M_i$ and $M_j$ under test to establish a path between the vertices.

Appreciation of the above-described process can be had in reference to FIG. 8. For an assumed value of γ, arc A–D meets the criteria of decision blocks 74, 78, and 80 of FIG. 7, and hence is established as drawn. Likewise, arcs A–C and C–E meet the criteria of decision blocks 74, 78, and 80 of FIG. 7, while arc E–F meets the criteria of decision blocks 74, 78, and 82. On the other hand, no arc B–D exists because the constraint of decision block 74 is not met; no arc A–E exists because the constraint of decision block 80 is not met; and no arc B–F exists because the constraint of decision block 82 is not met.

From block 84 in FIG. 7, the identifier kernel 16 of the system 10 proceeds to block 86, wherein the identifier kernel 16 of the system 10 stitches together vertices in the longest path found at block 84 to thereby establish a pair of first and second subsequences, each of which consists of the stitched windows from the associated sequence S, T. In finding the longest path in a match graph, e.g., the graph shown in FIG. 8 (the longest path of which is path A–C–E–F), the match graph is traversed in reverse topological sort order using, for example, the procedures set forth in Carre, *Graphs and networks*, Claredon Press, Oxford, 1978.

Preferably, the normalization scale is the same or approximately the same for all windows in a subsequence. During stitching, the scales for the windows corresponding to the arc being established can be compared to the scale used for the arc windows that have already been stitched, to ensure this occurs.

Figure 9:
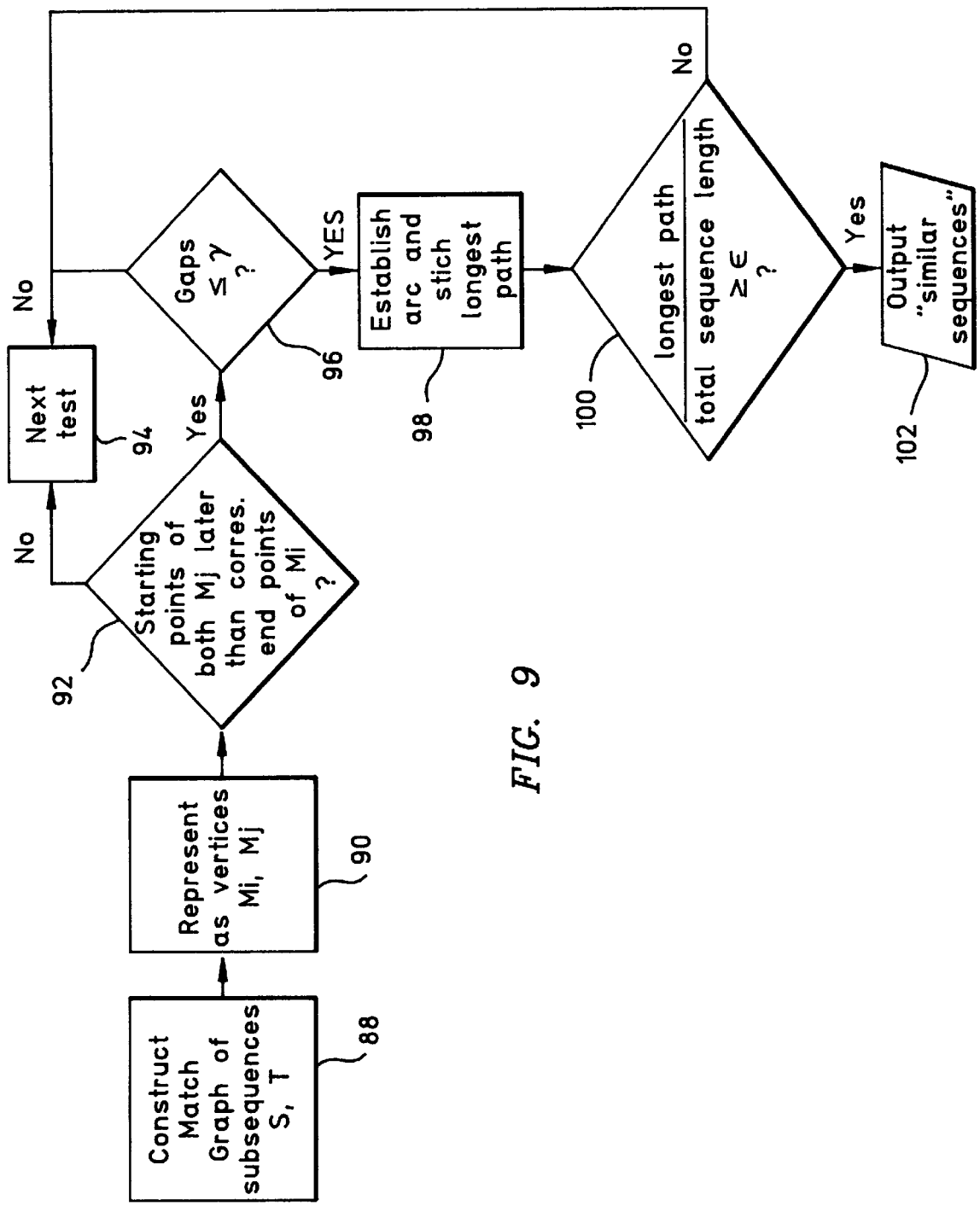
FIG. 9 is a flow chart showing the steps for stitching subsequences together.

After stitching matching pairs of windows to establish subsequences, the identifier kernel 16 of the system 10 proceeds to FIG. 9 to stitch subsequences together and determine whether the first time sequence S is similar to the second time sequence T. While FIG. 9 shows a set of executable steps that are separate from the steps shown in FIG. 7, it is to be understood that the processes can be combined.

Commencing at block 88 of FIG. 9, a match graph is constructed of the subsequences found in FIG. 7, in accordance with principles disclosed above. Then, each subsequence is represented as a respective vertex $M_i$, $M_j$, . . . at block 90, again using principles disclosed above.

From block 90, the identifier kernel 16 of the system 10 proceeds to decision block 92, wherein the identifier kernel 16 of the system 10 determines whether the times of the earliest data points in both subsequences $S_j$, $T_j$, represented by $M_j$, are respectively later than the times of the latest data points in both subsequences $S_i$, $T_i$, represented by $M_i$. In other words, the identifier kernel 16 of the system 10 determines whether the subsequences under test overlap. If the subsequences under test overlap, the identifier kernel 16 of the system 10 moves to block 94 to conduct the next test. Hence, in contrast to window stitching, no overlap is allowed in subsequence stitching.

If the subsequences under test do not overlap, the identifier kernel 16 of the system 10 moves to decision block 96 wherein it is determined whether the gap between the subsequences $S_i$ and $S_j$ and the gap between the subsequences $T_i$ and $T_j$ are less than a user-defined value $\gamma$. If so, the identifier kernel 16 of the system 10 proceeds to block 98, wherein an arc is established between the vertices $M_i$ and $M_j$ under test and, after all arcs have been established, the longest path in the match graph is determined using principles described previously. If the test condition at decision block 96 is not met, however, the identifier kernel 16 of the system 10 returns to block 94.

Once the longest matching subsequences (designated herein $SS_i$, $TT_i$) have been identified at block 98, the identifier kernel 16 of the system 10 moves to block 100. At block 100, the identifier kernel 16 of the system 10 determines whether the longest matching subsequences $SS_i$, $TT_i$ bear a predetermined relationship to at least one of the first or second time sequences S, T. In the presently preferred embodiment, at block 100 the identifier kernel 16 of the system 10 sums the lengths of all subsequences $SS_i$ and the lengths of all subsequences $TT_i$, and divides the sum by the sum of the lengths of the two time sequences S, T. When the quotient so obtained is at least equal to a user-defined predetermined threshold value $\epsilon$, the identifier kernel 16 of the system 10 proceeds to output block 102, to output the sequences S, T as having met the user-defined criteria for similarity. Otherwise, the identifier kernel 16 of the system 10 returns to block 94. Alternatively, if S and T have widely varying lengths, at block 100 the identifier kernel 16 of the system 10 can use twice the length of the shorter sequence of S, T as the divisor. Stated differently, at block 100 the identifier kernel 16 of the system 10 identifies the time sequence S as being similar to the time sequence T when the stitched subsequences bear a predetermined relationship to at least one of the time sequences S, T.

While the particular system and method for discovering similar time sequences in databases as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer system for identifying recurring patterns in data elements stored in a database, comprising:
   a computer;
   first means in the computer for identifying at least a first and a second time sequence in data elements stored in a database, each data element being characterized by at least a time and a magnitude;
   second means in the computer for identifying at least first and third subsequence windows, each having a plurality of the data elements, each of the first and third windows being a subset of the first time sequence, to be respectively similar to at least second and fourth subsequence windows, each having a plurality of the data elements and each being a subset of the second time sequence, when the difference between a magnitude of a data element of the first window and a magnitude of a data element of the second window is no more than a predetermined value and the difference between a magnitude of a data element of the third window and a magnitude of a data element of the fourth window is no more than the predetermined value; and
   third means for joining the first and third windows to establish a first subsequence representative of the first time sequence and joining the second and fourth windows to establish a second subsequence representative of the second time sequence for identifying recurring patterns in the database, when the first and third windows and the second and fourth windows are separated by respective time gaps and each gap is less than a predetermined value.

2. A computer system for accessing a database to determine similarity between time sequences in data elements stored in the database, comprising:
   a computer;
   first means in the computer for identifying at least a first and second time sequence in the data elements of a database;
   second means in the computer for identifying first and third subsequence windows, each having predetermined number of data elements and each being a subset of the first time sequence, to be respectively similar to second and fourth subsequence windows, each having the predetermined number of data elements and each being a subset of the second time sequence, when the difference between each data element of the first window and corresponding data elements of the second window is no more than a predetermined value and the difference between each data element of the third window and the corresponding data elements of the fourth window is no more than the predetermined value; and
   third means in the computer responsive to the first and third windows and second and fourth window being separated by respective gaps, each gap being less than a predetermined value, for joining the first and third windows to establish a first subsequence representative of the first time sequence and the second and fourth windows to establish a second subsequence representative of the second time sequence for identifying whether the first and second time sequences are similar.

3. A digital processing apparatus for accessing a database, comprising:
   a digital processor;
   first means for causing the processor to identify at least a first and a second time sequence in data elements stored in a database;
   wherein the data elements are each characterized by a time and a magnitude;
   second means for causing the processor to identify first and third subsequence windows, each having a plurality of the data elements, each of the first and third windows being a subset of the first time sequence, to be respectively similar to second and fourth sebsequence windows, each having a plurality of the data elements and each being a subset of the second time sequence, when the difference between a magnitude of a data element of the first window and a magnitude of a data element of the second window is no more than a predetermined value and the difference between a magnitude of a data element of the third window and a magnitude of a data element of the fourth window is no more than the predetermined value; and third means responsive to the first and third windows and second and fourth windows being separated by respective time gaps, each gap being less than a predetermined value for causing the processor to join the first and third windows to establish a first subsequence representative of the first time sequence, to join the second and fourth windows to establish a second subsequence representative of the second time sequence, and to determine whether the first and second time sequences are similar by comparing the first and second subsequences.

* * * * *